Dec. 18, 1956 P. H. LYNCH, JR 2,774,206

TANDEM DISC HARROW ARRANGEMENTS

Filed March 11, 1953 2 Sheets-Sheet 2

INVENTOR
P. H. LYNCH, JR.

BY *[signature]*

ATTORNEY

United States Patent Office 2,774,206
Patented Dec. 18, 1956

2,774,206

TANDEM DISC HARROW ARRANGEMENTS

Patrick Henry Lynch, Jr., Dunn, N. C.

Application March 11, 1953, Serial No. 341,672

7 Claims. (Cl. 55—30)

This invention relates to improvements in tandem disc harrow arrangements.

It is an object of my invention to provide means for mounting gangs of disc harrows in tandem whereby, when the forward gang rolls over a log, stone, mound or other article protruding above the general level of the soil in the vicinity of such article, the rear gang will not be lifted out of the soil and thereby leave unharrowed the soil approaching such article.

It is also an object to provide an arrangement which, in accomplishing the foregoing object will limit the motion of the rear gang or gangs relative to the forward gang.

It is a further object to provide an arrangement which, in accomplishing the foregoing objects, will prevent the rear gang or gangs from swinging laterally relative to the forward gang or gangs.

It is a further object to provide such an arrangement in which the rear gang or gangs may be easily removed at the option of the operator so that the forward gang or gangs may be employed as a bush and bog harow.

It is also an object to adapt the foregoing arrangement for use on different types of tractors, including, in particular, lift type tractors whereby the whole arrangement may be lifted off the ground by the lift mechanism of the tractor.

These and other objects I accomplish by providing a bent tongue designed to fit the tractor draw bar and to support one forward and one rear gang of disc harrows. The rear gang of harrows is mounted below a bar which is pivotably secured to the under side of the tongue. The forward gang is mounted directly to and below the tongue. The bar is disposed to open and close against the tongue in the manner of a jaw-opening, when the forward gang rises over an obstacle, and closing against the tongue in normal level operating position. Means are provided to prevent lateral swinging of the rear gang and the bar is thus secured to the tongue by means of a pin in brackets on the tongue. When the pin is withdrawn, the bar and the rear gang may be removed from the arrangement.

For more detailed explanation of my invention, reference is made to the annexed sheets of drawings in which:

Fig. 2a illustrates details for vertical and horizontal pivoting of the support for the forward gang of discs.

Figure 1:
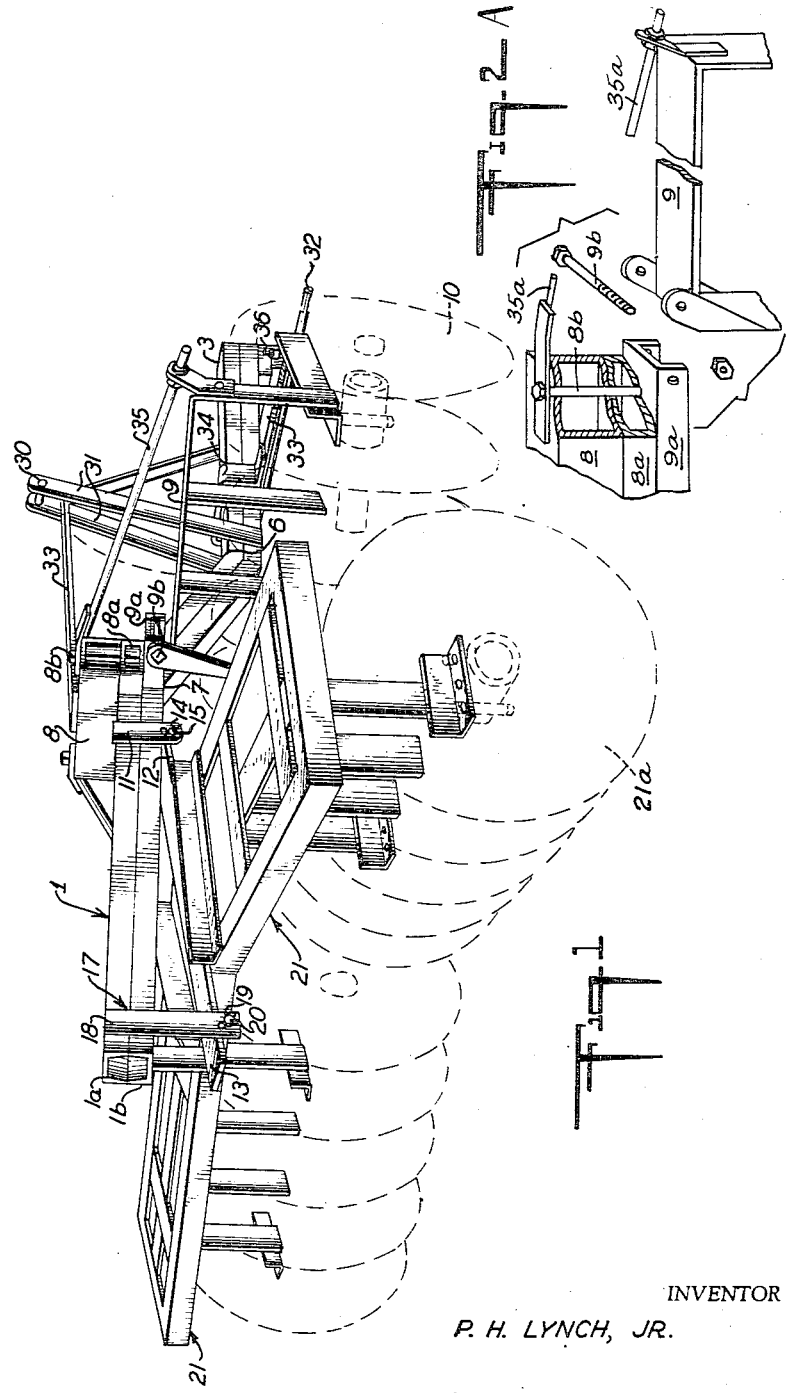
Fig. 1 is a perspective view taken from the back and side of my disc harrow arrangement constructed according to my invention and adapted for three point mounting on a hitch type tractor.
Figure 2:
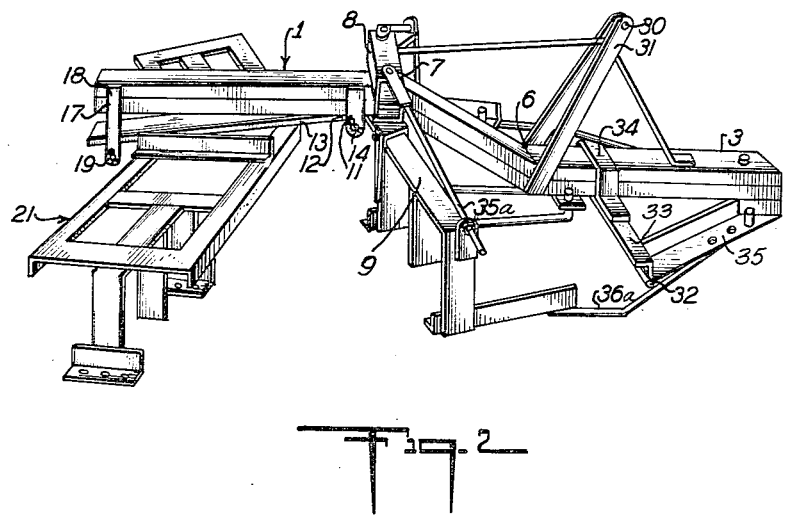
Fig. 2 is a perspective view of the Fig. 1 arrangement taken from above and one side thereof.
Figure 3:
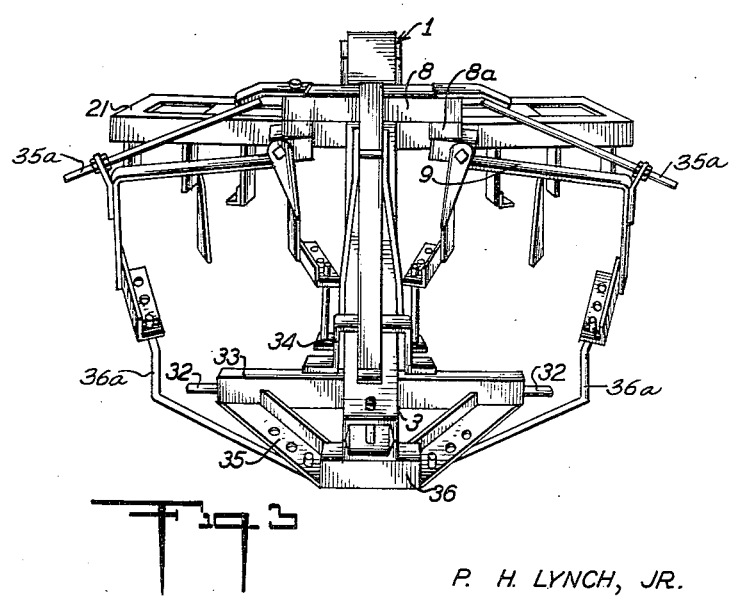
Fig. 3 is a front view of the Fig. 1 arrangement taken from a position slightly thereabove.

The preferred embodiment of my invention is shown in Figs. 1–3, adapted for mounting on a three point hitch type tractor. The tongue 1 is bent at 6 partially upwardly shortly behind the tractor and then rebent at 7 to its original direction. In plan view, the tongue 1 appears straight. Because of the heavy weight of the gangs of disc harrows which are supported by the tongue 1 as hereafter described, this tongue should be sturdily constructed. To this end, I have satisfactorily employed two pieces 1a, 1b of 4" x 1½" steel channel weighing 5.4 lbs. per foot. These channel pieces are welded together as shown in Fig. 1 to form a heavy piece with a rectangular cross section.

The forward gangs of disc harrows are mounted in a fashion well known to the art. Thus to the top side of this tongue 1 just behind the second bend 7, I weld a cross support member 8. This cross support member 8 serves to support the framing 9 for the forward gangs 10 of disc harrows in conventional manner. I have constructed cross support member 8 of two 3" x 4" angles ⅜" thick welded together to form a short piece also of rectangular cross section. On each side of tongue 1 below and to member 8 I weld a small steel box 8a which serves to hold, by means of vertical bolt 8b, support mounting 9a. This latter is thereby horizontally pivotable about the axis of the bolt 8b. The disc harrows themselves are held by frame 9 which is pinned and vertically pivotable about pin 9b. An enlarged detail illustrating the assembly for horizontal pivoting about 8b and vertical pivoting about bolt 9b is shown in Fig. 2a.

The forward disc harrow gangs are held in a fixed position by rod 35a and linkage 36a. Both rod 35a and linkage 36a, however, may be adjusted so as to permit the position of frame 9 to be changed by pivoting it about the axis of bolts 8b and 9b.

In addition, I provide a pair of orificed brackets 11 on the tongue 1 immediately following the cross-support member 8. These brackets receive between them the end 12 of jaw bar 13, to which end is welded a section of round heavy duty tubing to form a sleevelike end portion. When this end portion is slipped between brackets 11, the jaw bar 13 may be pivotally secured to tongue 1 by the insertion of pin 14 through the brackets and the sleevelike end of bar 13. Cotter pins 15 may be placed on pin 14 to lock the latter in position. As so constructed it will be seen that jaw bar 13 pivots about pin 14 in vertical alignment with and below tongue 1. To limit the arc of swing of jaw bar 13, and to prevent any lateral motion relative to tongue 1, I further provide near the rearwardly extending end of tongue 1, rigid side strapping 17. This strapping consists of two steel pieces which are welded at their upper extremities 18 to tongue 1 and extend downwardly in vertical alignment for at least the distance which it is desired to have the jaw bar 13 (with harrows mounted thereon as hereinafter described) drop below the tongue. The lower end of each strap 17 is orificed at 19 to accommodate a pin 20. This prevents the jaw bar 13 from dropping below the desired level, so that it will lift with the tongue when employed with a lift-type tractor. However, the pin 20 might be dispensed with and other means, such as a chain, provided to limit the downward swing of jaw bar 13. Also such limiting means might be dispensed with altogether on arrangements which are not intended to be lifted.

The jaw bar 13 should be of fairly heavy construction since it is to support the frames 21 for the rear gangs 21a of disc harrows. Thus, I have successfully used and recommend for the jaw bar 13 a steel piece 4 inches wide and ¾ of an inch thick for this purpose. The frames 21 are arrayed in sweptback wing fashion from bar 13 and are welded to the underside of the latter. The disc harrows 21a are mounted in conventional fashion to and below frames 21. The upper surfaces of the frames 21 may also serve as weight boxes in which weights, such as stones or sandbags, may be placed to hold the rear gangs 21 into the soil. The use of weights, however, are not essential to the operation of my arrangement and may be dispensed with.

The foregoing constitutes a description of the basic part of my invention which may be employed in disc harrow arrangements of the draw type (i. e. those not intended to be lifted) or in arrangements intended for use with either of the two types of lift tractors (i. e. the three point—hitch type; or the chain lift vertically movable tool bar type).

Where my invention is employed in such lift type arrangements, it is necessary to provide also some special means on the tongue whereby the latter may be connected to hoisting elements of the tractor's lift mechanism. In the embodiment illustrated in Figs. 1–3, I have provided a three point attachment to the lift mechanism of the tractor which is effected by means of the orifice 30 in the supported uprights 31 and the pin projections 32 on the cross support bar 33 which is strapped to the tongue 1 in the position indicated by the loop 34 and the pieces 35 welded to the bar 33 and extending to a cross block 36. The latter is welded below the forward extremity of the tongue.

In operation, because of the considerable weight of the arrangement, it will be found easiest to effect attachment thereof to the tractor by setting the tractor's lift mechanism in lowered position and backing the tractor to place its lift mechanism in proper position to connect it to the disc harrow arrangement. After connection, the arrangement may be hoisted and the tractor moved to the field to be worked. The arrangement is then lowered into the soil, until bar 13 is again pressing against the underside of tongue 1; weights are placed on the frames 21 (if desired), and the tractor driven over the area to be harrowed. When the tractor goes over a log or other object in the field, as the forward gang 10 rises over such object, tongue 1 will ride up with gang 10. However, at this point the weight of the rear gang 21 will tend to pull the free end of jaw bar 13 downwardly in an arc about pin 15 (within the limit of the distance between the bottom of tongue 1 and the pin 20). This permits the rear harrow gang 21 to remain in the soil until it in turn comes to the log, mound or other object and rises thereover. The rear harrow gangs are guided in a straight course by the rigid side strapping 17.

While I prefer the embodiment of my invention in an arrangement for a lift type tractor, its principle could also be utilized in any draw type tandem disc harrow arrangement such as is widely employed in the Western part of the United States. Also the opening jaw principle incorporated in my preferred embodiment of Fig. 1 could be utilized in a varied vertical jaw arrangement such as is shown diagrammatically in Fig. 6. All these variants of my novel arrangement, however, I intend to comprehend within the scope of my invention.

I claim:

1. A tandem disc harrow arrangement for use with a tractor, said arrangement comprising a tongue, said tongue having means on its forward portion whereby it may be secured appropriately to the tractor to extend rearwardly therefrom, a forward cross support member, the last said member being secured to the tongue transversely thereto, said member serving to support at least one gang of disc harrows transversely to the tongue, a jaw bar, said jaw bar being disposed to extend rearwardly in longitudinal alignment with and underlying a portion of the tongue, and said jaw bar being pivotally secured by its forward end to the said tongue to open away from said tongue upon being pivoted and to close against said tongue when said jaw bar is moved upwardly, framing secured to said jaw bar toward the free end thereof, disc harrows mounted below said framing and means mounted on the free end of said tongue restraining the free end of said jaw bar from lateral movement with respect to the tongue.

2. A tandem disc harrow arrangement for use with a tractor, said arrangement comprising a tongue, said tongue extending rearwardly in a substantially straight direction, said tongue further having means on its forward portion whereby it may be secured appropriately to the tractor to extend rearwardly therefrom, a forward cross support member, the last said member being secured to the tongue transversely thereto and at a point substantially forward, of the trailing end of the tongue, said member serving to support at least one gang of disc harrows on an axis transverse to the tongue, a jaw bar, said jaw bar being pivotally secured by its forward end to the underside of said tongue at a point forward of the trailing end of the tongue, said jaw bar extending from the last point approximately to the trailing end of the tongue, the said jaw bar being further disposed in vertical alignment with the tongue and said jaw bar being pivotable downwardly away from the tongue within such alignment, a pair of rigid straps secured to the tongue in the vicinity of its trailing end, said straps extending one on each side of the tongue downwardly for a predetermined distance to provide a vertical guide for said jaw bar, framing secured to said jaw bar toward the free end thereof, and disc harrows mounted below said framing.

3. A tandem disc harrow arrangement for use with a lift-type tractor, said arrangement comprising a tongue, said tongue extending rearwardly in a substantially straight direction, said tongue further having means on its forward portion whereby it may be secured appropriately to the lift mechanism of the tractor to extend rearwardly from the tractor to be liftable by said mechanism, said tongue being bent upwardly and then, after a predetermined distance, back to approximately its original direction, a forward cross support member, the last said member being secured to the tongue transversely thereto and at a point substantially forward, of the trailing end of the tongue and approximately at the point of rebending, said member serving to support at least one gang of disc harrows on an axis transverse to the tongue, a jaw bar, said jaw bar being pivotally secured by its forward end to the underside of said tongue, at a point forward of the trailing end of the tongue, said jaw bar extending from the last said point approximately to the trailing end of the tongue, the said jaw bar being further disposed in vertical alignment with the tongue and said jaw bar being pivotable downwardly away from the tongue within such alignment, a pair of rigid straps secured to the tongue in the vicinity of its trailing end, said straps extending one on each side of the tongue downwardly for a predetermined distance to provide a vertical guide for said jaw bar, framing secured to said jaw bar toward the free end thereof, and disc harrows mounted below said framing.

4. The arrangement as described in claim 1, wherein the jaw bar is pivotally secured to the tongue by means of pin disposed transversely to the tongue and supported by brackets secured to the tongue, and said pin is manually removable from said brackets and said jaw bar, whereby the later, with its framing and disc harrows, may, at the option of the operator, be removed from the arrangement.

5. The arrangement as described in claim 1, wherein the framing has a level upper surface upon which weights may be placed to hold in the ground disc harrows mounted below the framing.

6. The arrangement as described in claim 3 wherein the straps are connected by a cross pin at their lower extremities to limit the arc of swing of the jaw bar.

7. The arrangement as described in claim 3 wherein means are provided to limit the arc of swing of the jaw bar within the straps.

References Cited in the file of this patent

UNITED STATES PATENTS

| | | |
|---|---|---|
| Re. 22,627 | McKay | Apr. 3, 1945 |
| 2,192,252 | Zink et al. | Mar. 5, 1940 |
| 2,298,499 | Morkoski | Oct. 13, 1942 |
| 2,366,386 | Clark | June 2, 1945 |
| 2,552,307 | Bowman | May 3, 1951 |